Sept. 28, 1954  J. W. BALLARD  2,690,335
RUBBER SPRING
Filed Jan. 30, 1952  3 Sheets-Sheet 1
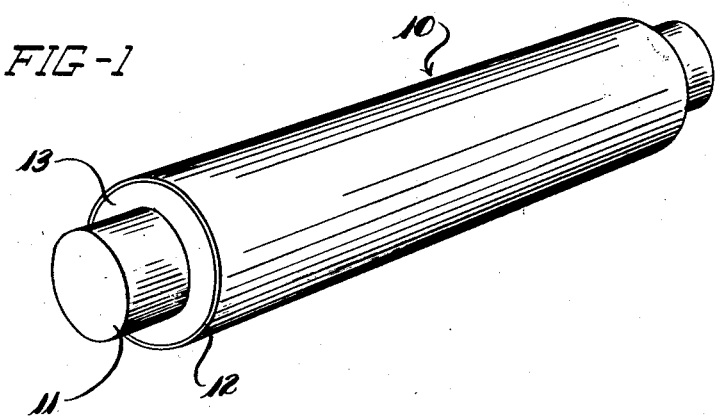
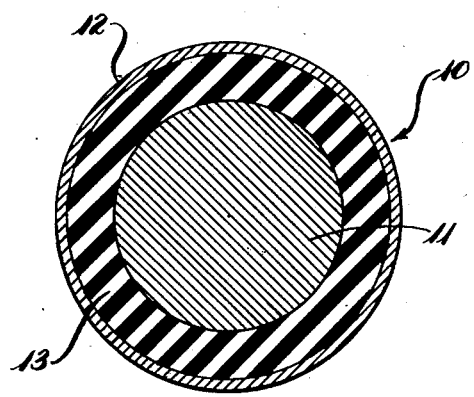
INVENTOR.
JAMES W-BALLARD
BY
ATTYS- Sept. 28, 1954    J. W. BALLARD    2,690,335
RUBBER SPRING
Filed Jan. 30, 1952    3 Sheets-Sheet 2
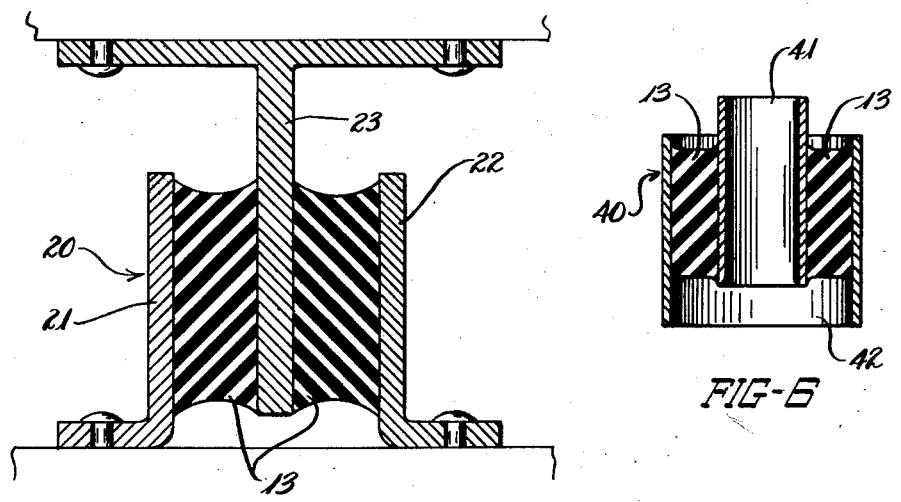
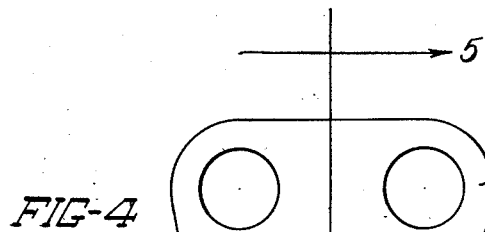
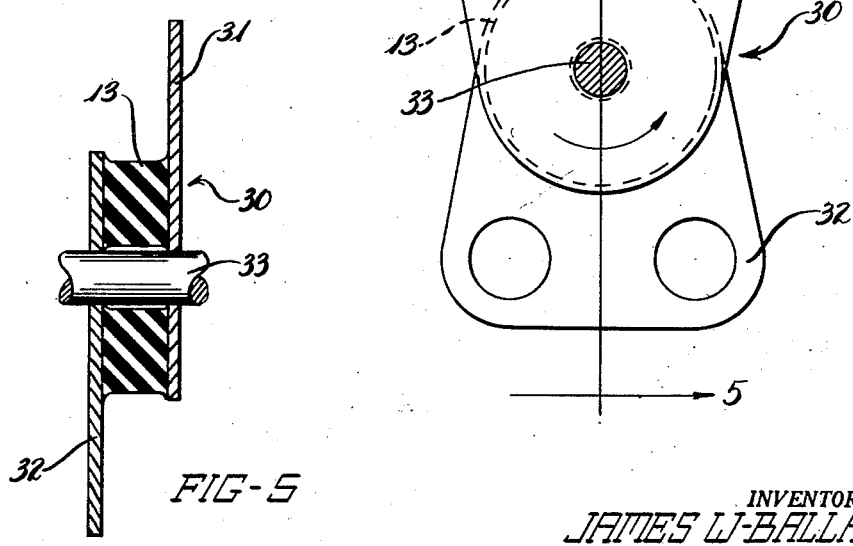
INVENTOR.
JAMES W. BALLARD
BY
Ely & Frye
ATTYS

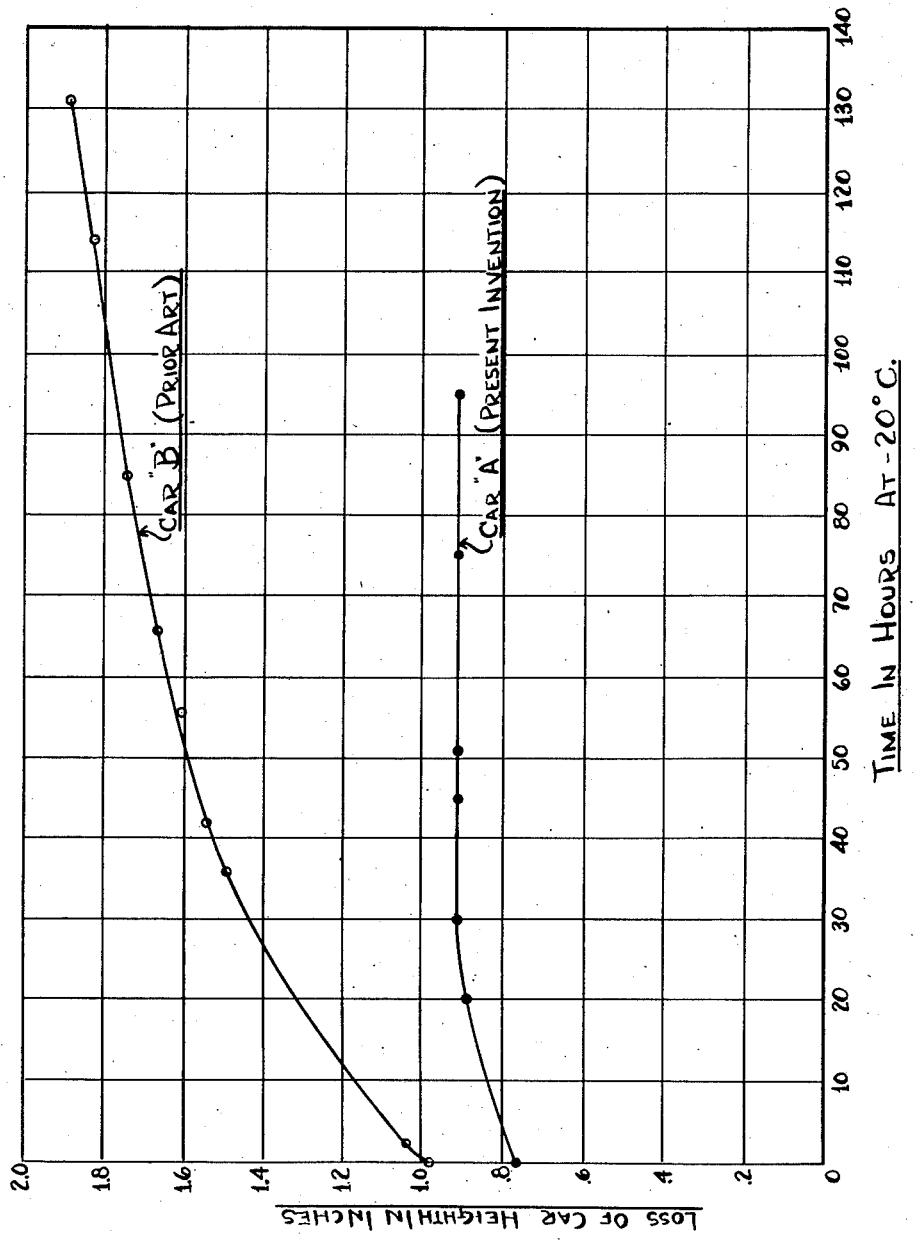

Patented Sept. 28, 1954

2,690,335

UNITED STATES PATENT OFFICE 2,690,335

RUBBER SPRING

James W. Ballard, Ravenna, Ohio, assignor to The Firestone Tire & Rubber Company, Akron, Ohio, a corporation of Ohio Application January 30, 1952, Serial No. 269,095

7 Claims. (Cl. 267—63)

This invention relates to spring suspensions which depend upon rubber for their load-bearing and springing action. More particularly, the invention relates to rubber springs wherein the load-bearing of the rubber is primarily in shear.

The use of rubber compositions in the production of shear type springs has, heretofore, been attended with various difficulties which have greatly retarded their general acceptance. One of the greatest of these difficulties has been that of producing a spring which has uniform load-bearing capacity under varying conditions. It has been noted particularly that the load-bearing capacities of such rubber-containing springs vary greatly when exposed to varying temperatures. For example, when vehicles equipped with the heretofore proposed rubber springs are subjected to low temperatures, such as those common in many geographical localities during a substantial portion of a year, the rubber in the spring loses its load-bearing capacity and the vehicle settles undesirably. The loss of load-bearing capacity of the rubber is often so complete that the vehicle is no longer supported at all by its spring suspension system.

In the long history of designing rubber compounds to perform a particular function, more and more additives have been incorporated into the rubber. When great strength, increased stiffness, improved resistance to abrasion, tearing, etc. are to be required of a rubber compound, the so-called reinforcing agents have been found of particular utility. Chief among such agents are the various carbon blacks. Other materials are also effective such as silica, silicates, certain carbonates and the like. Additionally, many other materials of non-reinforcing character have been added as fillers and to improve processing, e. g. whiting, barytes, talc, infusorial earth, slate flour, cellulosic fibers and the like. The materials of both classes may all be generally characterized as particulate matter which does not dissolve in rubber during vulcanization. The above rubber-insoluble particulate materials are to be distinguished from vulcanizing agents, vulcanization accelerators, activators and retarders, antioxidants, processing oils and waxes and the like which are considered to dissolve in or chemically combine with rubber during the process of vulcanization.

It was to be expected that a rubber compound suitable for supporting relatively considerable loads, as for example the loads supported by vehicular suspensions, must necessarily contain substantial proportions of particulate matter of the rubber-insoluble type. The rubber springs prior to the present invention, therefore, included rubber containing large amounts of rubber-insoluble reinforcing particulate matter. Typical compounds of these heretofore proposed rubber springs included reinforcing pigments in the order of from about 30 to 60 parts by weight based on the weight of rubber. These prior art springs were greatly affected by temperature variations and particularly were subject to considerable loss of load-bearing capacity at low temperatures.

An object, therefore, of the present invention is to provide a rubber-containing spring which is essentially unaffected by low temperatures. Another object is to provide a rubber-containing spring having a relatively uniform load-bearing capacity despite great variation in temperature. A still further object is to provide an improved vehicle spring suspension.

Quite unexpectedly, the above and further objects are obtained by the combination in a spring of relatively movable, spaced, rigid members bonded or frictionally engaged to an intermediate body of vulcanized natural rubber containing essentially no or only relatively little added rubber-insoluble particulate matter, the load-bearing of the spring being yieldingly provided by shear stresses imposed upon the rubber body. Not only are the springs of the invention essentially unaffected by wide variations of temperature but such springs have extraordinarily long life. A more complete understanding of the invention may be had by reference to the detailed description which follows and the accompanying drawings in which:

Fig. 1 is a schematic view in perspective of a torsional rubber spring embodying the invention;

Fig. 2 is a view showing the torsion spring of Fig. 1 in section;

Fig. 3 is a cross section of a rubber spring embodying the invention wherein the rubber is subjected to linear shear between plates;

Fig. 4 is an elevational view of a rubber spring embodying the invention wherein the rubber is subjected to rotational shear between discs;

Fig. 5 is a sectional view of the spring of Fig. 4 taken along line 5, 5;

Fig. 6 is a diagrammatic view in section showing a rubber spring embodying the invention wherein the rubber is subjected to linear shear between coaxial tubes; and Fig. 7 is a graph showing relative losses of height at low temperatures of a vehicle equipped with rubber springs in accordance with the prior art and a vehicle equipped with rubber springs in accordance with the invention.

Torsion springs have been proposed which consist essentially of a resilient bushing or annulus disposed between and bonded or frictionally engaged to generally cylindrical inner and outer torque elements. Such bushings are adapted to provide yieldable resistance to the relative rotational movement of the inner and outer torque elements when torsional stress is applied to the assembly. One of the torque elements is connected in operating relationship with the frame or chassis of a vehicle and the other torque element is connected in operating relationship with the running gear of the vehicle. The springing action of the resulting suspension is derived from the yieldable resistance to rotational movement provided by the resilient bushing when subjected to torsional shearing forces.

Referring to Fig. 1 and Fig. 2, a torsion spring 10 is shown having an inner torque element 11, an outer torque element 12 concentrically spaced from element 11 and a rubber composition 13 disposed between the elements 11 and 12 in engaging relation thereto. The composition of the rubber material 13 will be described in detail hereafter.

It should be noted here that the illustrations of Fig. 1 and Fig. 2 are intended to be entirely schematic since the operation of the invention is not dependent upon any particular torsional design or the mechanical construction details thereof. Many variations of shapes and configurations of the various elements of a torsion rubber spring may be made without departing from the spirit of the invention. While the surfaces of elements 11 and 12 are illustrated as generally smooth, they may if desired be serrated or otherwise roughened in any fashion calculated to assist in obtaining a bonded or frictional engagement with the rubber. The rubber may be bonded or frictionally engaged to elements 11 and 12. That is, the rubber 13 is bonded to elements 11 and 12 either by vulcanization, adhesion or frictional contact between the rubber and the metal or other rigid material used. Additionally, the outer element 12, in the operation of the spring, may be the supporting member as by being attached by suitable means (not shown) to the chassis of a vehicle while the inner element 11 may be the supported member and may be adapted to rotate, as by being attached by suitable means (not shown) to the running gear of a vehicle. Conversely, the inner element 11 may be the supporting member while the outer element 12 may be adapted for rotational movement, thus operating as the supported member.

While a spring of the type illustrated by Figs. 1 and 2, wherein the rubber is subjected to rotational shear between spaced apart cylinders, represents a preferred embodiment of the invention, the invention is also effective in other types of rubber springs which include rubber in shear between spaced apart supporting and supported members. Thus the rubber may be subjected to linear shear by the relative parallel movement of parallel plates or the relative axial movement of coaxial tubes. Additionally, the rubber may be subjected to rotational shear between discs which are adapted for relative movement about a common axis perpendicular to the discs. Figs. 3, 4, 5 and 6 illustrate some of these additional embodiments.

Referring to Fig. 3, a spring 20 is shown having parallel spaced apart plates 21 and 22 as supporting members, plate 23 as a supported member between and spaced from plates 21 and 22 and rubber 13, the composition of which will hereatfer be described in detail, interposed between and engaged by suitable means to plates 21, 22 and 23. As in the case of the torsion springs illustrated and described previously, the construction details of this linear shear type spring may be considerably varied from the details shown in the drawing. For example, the combined total of supported and supporting members (plates) may be any desired plurality consisting of two or more.

Referring to Figs. 4 and 5, a spring 30 is shown having rubber 13 interposed between generally disc like members 31 and 32, the opposite faces of which are adapted to rotate about a common axis 33 perpendicular to members 31 and 32 thus subjecting rubber 13 to a rotational shearing action. Here too, variations in construction details may be made without departing from the spirit of the invention.

Referring to Fig. 6, a spring 40 is shown having rubber 13 interposed between and engaged by suitable means to inner and outer spaced apart coaxial tubes 41 and 42 which are adapted for relative axial movement thus imposing linear shearing stresses upon the rubber 13. As in the case of the other types of springs previously illustrated and discussed, many variations of design and construction may also be made in a spring of the type illustrated by Fig. 6 without departing from the contemplation of the invention.

*Example 1*

As an illustration of the invention, a rubber stock in accordance with the invention, containing essentially no particulate matter insoluble in rubber during curing, is prepared according to the following recipe:

| | Parts by weight |
|---|---|
| Natural rubber | 100 |
| Sulfur | 3.0 |
| Stearic acid | 3.0 |
| Zinc oxide | 3.0 |
| Accelerator (N-cyclohexyl-2-benzothiazole sulfenamide) | 1.0 |
| Antioxidant | 1.5 |

Torsion springs are prepared of the type illustrated by Figs. 1 and 2 using the above rubber stock as the rubber 13. The assembled springs are then subjected to an optimum cure, e. g. at 138° C. for 60 minutes, thereby bonding the rubber to the inner and outer elements. At 400% elongation this stock having the above cure exhibits a modulus of 775 p. s. i. Suitable cements may be desirable to improve the bonding. An automobile is equipped with the completed springs. This automobile will hereafter be referred to as car A.

Another set of springs is prepared of identical design and construction to those of car A except that the rubber portions are of a stock of the following recipe, highly loaded with particulate matter insoluble in rubber during curing:

| | Parts by weight |
|---|---|
| Natural rubber | 100 |
| Sulfur | 1.6 |
| Zinc oxide | 5.0 |
| Litharge | 0.4 |
| Carbon black | 30.0 |
| Softener | 3.0 |
| Accelerator (tetramethylthiuram disulfide) | 1.6 |
| Antioxidant | 1.5 |

The above stock contains at least 30 parts by weight of rubber-insoluble particulate matter. The assembled springs are subjected to an optimum cure, e. g. 17 minutes at 138° C. This stock having the above cure exhibits a modulus of 1160 p. s. i. at 400% elongation. Another automobile (car B) of the same make, model, year and weight as car A is equipped with this last set of springs.

The height of cars A and B above the ground is determined. The two cars are then moved into a cold room maintained at —20° C. and the height of the two cars again determined. The change in height (loss) is observed periodically. Figure 7, which plots loss of height in inches versus time in hours, shows the relative behavior during long subjection to low temperature of car A equipped with springs in accordance with the invention and car B equipped with springs of a type heretofore used but not in accordance with the invention. The readings recorded at zero hours in Fig. 7 represent the loss in height which occurs while moving the cars into the cold room.

Referring to the curves shown in Fig. 7, it is seen that a prior art rubber spring containing the usual relatively high loading of rubber-insoluble particulate matter (car B) continues to let a car down at a relatively constant rate when the car is maintained at a low temperature. After 130 hours car B has settled almost 2 inches and further settling is indicated. In contrast to this undesirable behavior, a rubber spring in accordance with the invention, containing essentially no rubber-insoluble particulate matter allows a car to settle only very little. In this respect, car A settles only 0.9 inch from the time it is introduced into the cold room until about 30 hours have elapsed; no further settling is indicated for greater lengths of time under low temperatures.

A relationship has been found between losses of stress of a cured rubber compound observed over an extended range of temperatures and the settling at low temperatures of a car equipped with springs embodying the rubber compound. Rubber springs in accordance with the invention, which are essentially unaffected at low temperatures, may be produced from those natural rubber compounds which, after having been given an optimum cure, exhibit a loss of stress of no more than about 28% when subjected to successive periodic temperature decrements of 10° C. every 20 minutes in the range of temperatures from 70° C. to —20° C. while the cured compound is maintained under a constant strain of 175% elongation. Many of the preferred compounds of the invention exhibit stress losses of less than 25% when subjected to the above conditions. The stress loss of a cured sample of the stock used to produce the springs of car A (in accordance with the invention) under such conditions is 23.7%. Springs produced from rubber compositions which exhibit a stress loss of more than 28% under the above conditions (not in accordance with the invention) are undesirably affected by variations in temperature; for example, their load-bearing capacity is dissipated at sub-zero temperatures. The stress loss under the above conditions of a cured sample of the stock used to produce the springs for car B (not in accordance with the invention) is 39%.

*Example 2*

Further springs in accordance with the invention are produced when the rubber 13 of Figs. 1, 2, 3, 4, 5 and 6 is made from the following rubber stock:

| | Parts by weight |
|---|---|
| Natural rubber | 100 |
| Sulfur | 3 |
| Zinc oxide | 3 |
| Stearic acid | 0.5 |
| Accelerator (mercaptobenzothiazole) | 1.0 |
| Antioxidant | 1.0 |

It should be noted that this rubber stock contains only 3 parts by weight of zinc oxide, all of which is considered to take part in the vulcanization process or to dissolve in the rubber. All other compound ingredients added here are also considered to take part in the vulcanizing process. The stock can be said, therefore, to contain essentially no added rubber-insoluble particulate matter. An optimum cured (75 minutes at 132° C.) sample of the above stock exhibits a stress loss of 23.5% when subjected to successive temperature decrements of 10° C. every 20 minutes over the range of temperatures of 70° C. to —20° C. while being maintained under a constant strain of 175% elongation. Springs including this rubber stock are essentially unaffected by low temperatures.

*Example 3*

Other springs in accordance with the invention are produced when rubber 13 is composed of the following rubber stock:

| | Parts by weight |
|---|---|
| Natural rubber | 100 |
| Sulfur | 3 |
| Zinc Oxide | 3 |
| Stearic acid | 3 |
| Accelerator (mercaptobenzothiazole) | 1.0 |
| Antioxidant | 1.0 |

Here too, there is essentially no added rubber-insoluble particulate matter. The stress loss of an optimum cured (40 minutes at 138° C.) sample of this stock is 23.3% under the conditions outlined in Example 2. Springs including rubber of this composition are also essentially unaffected by low temperatures. At 400% elongation this stock having the above cure exhibits a modulus of 700 p. s. i.

*Example 4*

Other springs in accordance with the invention are produced from a rubber stock identical with the recipe shown in Example 3 except that it contains additionally 0.5 part by weight of carbon black per 100 parts of rubber. This stock contains approximately 0.5 part by weight of added rubber-insoluble particulate matter per 100 parts rubber. The stress loss of an optimum cured (60 minutes at 138° C.) sample of this stock is 23.2% under the conditions outlined in Example 2. At 400% elongation the above cured stock has a modulus of 775 p. s. i. Springs including this composition are essentially unaffected by low temperatures.

*Example 5*

Other springs in accordance with the invention are produced from a rubber stock identical with that of Example 3 except that it contains additionally 3.0 parts by weight of carbon black per 100 parts by weight of rubber. This stock contains approximately 3.0 parts added rubber-insoluble particulate matter per 100 parts of rubber. The stress loss of an optimum cured (40 minutes at 138° C.) sample of this stock is 24.4% under the conditions outlined in Example 2. At 400% elongation the above cured stock has a modulus of 775 p. s. i. A spring including this stock also is essentially unaffected by low temperatures.

Example 6

Other springs in accordance with the invention are produced from a rubber stock identical with that of Example 3 except that it contains additionally 5.0 parts carbon black by weight per 100 parts of rubber. This stock contains approximately 5.0 parts by weight of added rubber-insoluble particulate matter per 100 parts of rubber. The stress loss of an optimum cured (40 minutes at 138° C.) sample of this stock is 24.9% under the conditions outlined in Example 2. At 400% elongation the above cured stock has a modulus of 875 p. s. i. A spring including this composition is also essentially unaffected by extended periods of subjection to low temperatures.

Example 7

Other springs in accordance with the invention are produced from a rubber stock identical with that of Example 3 except that it contains additionally 10 parts of carbon black by weight per 100 parts of rubber. This stock contains about 10 parts by weight of added rubber-insoluble particulate matter per 100 parts of rubber. The stress loss of an optimum cured (40 minutes at 138° C.) sample of this stock under the conditions outlined in Example 2 is 27.0%. At 400% elongation the above cured stock has a modulus of 1125 p. s. i. While springs including this rubber compound are slightly more affected by low temperatures than the springs containing less added rubber-insoluble particulate matter, such springs are considerably superior to those springs heretofore proposed.

Example 8

Other springs in accordance with the invention are produced wherein the rubber 13 is made from a rubber stock of the following composition:

| | Parts by weight |
|---|---|
| Natural rubber | 100 |
| Sulfur | 1.6 |
| Zinc oxide | 5.0 |
| Accelerator (tetramethylthiuram disulfide) | 1.6 |
| Litharge | 0.4 |

This stock contains approximately 2 parts added rubber-insoluble particulate matter per 100 parts rubber. The stress loss of an optimum cured (20 minutes at 132° C.) sample of this stock under the conditions outlined in Example 2 is 27.5%. Springs including rubber of this composition are somewhat affected by low temperatures but are considerably superior to heretofore proposed springs.

Example 9

Other springs in accordance with the invention are produced by the use of a rubber 13 made from a stock of the following composition:

| | Parts by weight |
|---|---|
| Natural rubber | 100 |
| Sulfur | 3.0 |
| Zinc oxide | 2.5 |
| Stearic acid | 3.0 |
| Accelerator (N-cyclohexyl-2-benzothiazole sulfenamide) | 1.0 |
| Antioxidant | 1.5 |

This stock contains essentially no added rubber-insoluble particulate matter. The stress loss of an optimum cured (60 minutes at 138° C.) sample of this stock is 23.0% under the conditions outlined in Example 2. At 400% elongation the above cured stock has a modulus of 750 p. s. i. Springs including this rubber composition are essentially unaffected by low temperatures.

Example 10

Still other springs in accordance with the invention are produced when the rubber composition of the rubber 13 is produced from a stock differing from that of Example 9 only in that 2.0 parts of zinc oxide are used instead of the 2.5 used in Example 9. An optimum cured (60 minutes at 138° C.) sample of this stock has a stress loss of 22.8% under the conditions outlined in Example 2. At 400% elongation the above cured stock has a modulus of 425 p. s. i. Springs including this rubber composition are essentially unaffected by temperature variation.

Example 11

Other springs in accordance with the invention are produced by the use of a rubber 13 made from a stock of the following recipe:

| | Parts by weight |
|---|---|
| Natural rubber | 100 |
| Sulfur | 3.0 |
| Zinc oxide | 3.0 |
| Stearic acid | 3.0 |
| Accelerator (mercaptobenzothiazole) | 1.3 |
| Antioxidant | 1.0 |

This stock contains essentially no added rubber-insoluble particulate matter and an optimum cured (20 minutes at 138° C.) sample exhibits a stress loss of 24.0% under the conditions outlined in Example 2. At 400% elongation the above cured stock has a modulus of 400 p. s. i. Springs including this rubber compound are essentially unaffected by extended exposure to low temperatures.

Example 12

Other springs in accordance with the invention are produced by the use of a rubber 13 made from a stock identical with that of Example 11 except for the use of a different accelerator, i. e., 1.0 part by weight of cyclohexyl-diethyl-thiocarbamyl sulfenamide. This stock also contains essentially no added rubber-insoluble particulate matter. The stress loss exhibited by an optimum cured (40 minutes at 138° C.) sample of this stock is 23.1% under the conditions outlined in Example 2. At 400% elongation the above cured stock has a modulus of 400 p. s. i. A spring including this rubber compound is also essentially unaffected by extended exposure to low temperatures.

Example 13

Still other springs in accordance with the invention are produced by the use of a rubber 13 made from a rubber stock identical with that of Example 11 except for the use of a different acceleration, i. e., 0.9 part by weight of benzothiazyl disulfide and 0.5 part by weight of dibutyl ammonium oleate. This stock also contains essentially no added rubber-insoluble particulate matter and an optimum cured (40 minutes at 138° C.) sample of the stock exhibits a stress loss of 23.7% under the conditions outlined in Example 3. At 400% elongation the above cured stock has a modulus of 550 p. s. i. Springs including this rubber composition also are essentially unaffected by temperature variations.

Other known vulcanization accelerators and combinations thereof may be satisfactorily substituted for the specific accelerators shown in the examples. Especially, the relatively-active accelerators are generally preferred to the slow-acting type. Such preferred classes of accelerators include the large classes of thiazole sulfenamides, thiazoline sulfenamides, thiocarbamyl sulfenamides, mercapto thiazoles, mercapto thiazolines, thiazolyl disulfides, the dithiocarbamates, the thiuram sulfides, the xanthogen sulfides, metallic salts of mercapto thiazoles or mercapto thiazolines or dithiocarbamic acids, lead oxides and salts. One or more accelerator activator may be employed with any of the accelerators mentioned where desired, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations may be employed in a single rubber compound.

Free sulfur is the common curing agent employed in connection with an accelator or accelerator combination, and it is generally desirable to avoid a great excess of free sulfur in the rubber compound, since more than about five parts per 100 parts of rubber usually produces less satisfactory results. Other curing agents such as selenium and tellurium may be used in conjunction with or replacing sulfur.

It may be desirable to make use of a sulfur-bearing curing agent in order to produce a vulcanized rubber with better resistance to aging and with other desirable qualities. Little or no free sulfur is generally employed in such curing agent. A large number of such curing agents are becoming increasingly well known in the rubber art, examples of this class of agents being the various phenol polysulfides including the alkyl derivatives thereof, the xanthogen polysulfides, the thiuram disulfides and polysulfides, various amine sulfides including dialkyl amine polysulfides and reaction products of primary amines with excess sulfur. Certain extremely finely divided colloidal sulfur preparations may sometimes be advantageous.

Other curing agents which may be utilized include the well known nitroso compounds, oximes, nitro compounds, azo compounds, and other materials which often act as oxidizing agents.

It is also known that rubber may be vulcanized by treatment with X-rays, cosmic rays, electron beams, ultra high frequency electromagnetic waves and ultrasonic vibration. These vulcanizing means may be combined with any of the curing agents mentioned above. The rubber compound may be heated in any known manner, including electronic heating, infra red heating, as well as the more conventional steam, hot water and oven heating methods. Ordinarily, vulcanization is effected by heating the rubber composition at temperatures in the range of from 93° C. to 204° C. Since the temperature coefficient of vulcanization is in the range of 2.0 to 3.0 per 10° C., it is obvious that higher or lower vulcanization temperatures may be employed.

While so-called synthetic rubbers have heretofore been proposed for the rubber portion of shear type springs, none of these synthetic rubbers has yet to my knowledge possessed sufficient strength and load-bearing capacity to be practical. Synthetic rubber-containing springs are, therefore, not contemplated or included as a part of the present invention.

The above specific examples, however, are intended as illustrative and should not be used to unduly limit the scope of the invention. By way of summary, it has been found that natural rubber compositions containing relatively little or no added particulate matter, which is insoluble in rubber during vulcanization, are ideally adapted to the production of rubber springs of the shear type. The most preferred springs of the invention are those including a natural rubber compound containing no added rubber-insoluble particulate matter. However, desirable springs within the contemplation of the invention are produced from rubber compounds containing as much as about 10 parts by weight of added rubber-insoluble particulate matter per 100 parts of rubber. An intermediate preferred group of springs are those produced from rubber compounds containing about 5 or less parts by weight of rubber-insoluble particulate matter per 100 parts of rubber.

The outstanding advantage of springs of the invention resides in their relative independence of temperature conditions. Their load-bearing capacities are essentially unaffected by extended exposure to very low temperatures. This advantage is particularly desirable in the suspensions of vehicles to be used in sub-zero weather, since vehicles equipped with such spring suspensions are supported without adjustment at substantially unchanged distances above the ground despite long exposure to sub-zero temperatures. It should here be noted that the temperature independence of the springs of the invention is not restricted to low or sub-zero temperatures. On the contrary, the uniform load-bearing characteristics of the springs of the invention are not adversely affected by elevated temperatures. Observed temperatures of 80° C. have produced no harmful effect upon springs of the invention.

The rubber compositions used in the invention may be conveniently characterized, as previously pointed out, by the fact that when cured under optimum conditions they exhibit a stress loss of no more than about 28% when subjected to periodic temperature decrements of 10° C. every 20 minutes from 70° C. to −20° C. while being maintained under a constant strain of 175% elongation.

What I claim is:

1. A rubber spring of the type in which two relatively movable, spaced, rigid members are secured to an intermediate body of a vulcanized natural rubber composition and in which the load is yieldingly carried by shear stresses imposed upon the rubber body, said rubber composition being prior to vulcanization substantially as follows:

| | Parts by weight |
|---|---|
| Natural rubber | 100 |
| Curing agent | 1 to 5 |
| Zinc oxide | 2 to 3 |
| Stearic acid | 0.5 to 3.0 |
| Accelerator | 1.0 to 1.6 |
| Antioxidant | 1.0 to 1.5 | said rubber composition being essentially free of rubber-insoluble particulate matter and said rubber composition being characterized by exhibiting a stress loss of no more than about 25% when subjected to 10° C. decrements every 20 minutes from 70° C. to −20° C. while said composition is maintained at a constant strain of 175% elongation.

2. A rubber spring of the type in which two relatively movable, spaced, rigid members are secured to an intermediate body of a vulcanized natural rubber composition and in which the load is yieldingly carried by shear stresses imposed upon the rubber body, said rubber composition being prior to vulcanization substantially as follows:

| | Parts by weight |
|---|---|
| Natural rubber | 100 |
| Curing agent equivalent to sulfur at | 1 to 5 |
| Accelerator | 1.0 to 1.6 |
| Accelerator activator | 2.5 to 8.0 | said rubber composition being essentially free of rubber-insoluble particulate matter and said rubber composition being characterized by exhibiting a stress loss of no more than about 25% when subjected to 10° C. decrements every 20 minutes from 70° C. to −20° C. while said composition is maintained at a constant strain of 175% elongation.

3. A torsion spring comprising an inner torque element, an outer torque element and a resilient annulus disposed between and secured to said inner and outer torque elements, said annulus comprising a vulcanized natural rubber composition, said rubber composition being prior to vulcanization substantially as follows:

| | Parts by weight |
|---|---|
| Natural rubber | 100 |
| Curing agent equivalent to sulfur at | 1 to 5 |
| Accelerator | 1.0 to 1.6 |
| Accelerator activator | 2.5 to 8.0 | said rubber composition being essentially free of rubber-insoluble particulate matter and said rubber composition being characterized by exhibiting a stress loss of no more than about 25% when subjected to 10° C. decrements every 20 minutes from 70° C. to −20° C. while said composition is maintained at a constant strain of 175% elongation.

4. A vehicular spring comprising an inner generally cylindrical member disposed concentrically inside and in spaced relationship to an outer generally cylindrical member and a rubber member disposed between and secured to said inner and outer members, said rubber member comprising a vulcanized natural rubber composition, said rubber composition being prior to vulcanization substantially as follows:

| | Parts by weight |
|---|---|
| Natural rubber | 100 |
| Curing agent equivalent to sulfur at | 1 to 5 |
| Accelerator | 1.0 to 1.6 |
| Accelerator activator | 2.5 to 8.0 | said rubber composition being essentially free of rubber-insoluble particulate matter and said rubber composition being characterized by exhibiting a stress loss of no more than about 25% when subjected to 10° C. decrements every 20 minutes from 70° C. to −20° C. while said composition is maintained at a constant strain of 175% elongation.

5. A spring comprising a plurality of spaced apart plates adapted for relative parallel movement and a vulcanized rubber composition sandwiched between and secured to said plates for providing yieldable resistance in shear to said relative parallel movement, said rubber composition being prior to vulcanization substantially as follows:

| | Parts by weight |
|---|---|
| Natural rubber | 100 |
| Curing agent equivalent to sulfur at | 1 to 5 |
| Accelerator | 1.0 to 1.6 |
| Accelerator activator | 2.5 to 8.0 | said rubber composition being essentially free of rubber-insoluble particulate matter and said rubber composition being characterized by exhibiting a stress loss of no more than about 25% when subjected to 10° C. decrements every 20 minutes from 70° C. to −20° C. while said composition is maintained at a constant strain of 175% elongation.

6. A spring comprising a plurality of spaced apart discs adapted for relative rotational movement about an axis perpendicular to the faces of said discs and a vulcanized rubber composition sandwiched between and secured to said discs in a manner to provide yieldable resistance to said relative rotational movement, said rubber composition being prior to vulcanization substantially as follows:

| | Parts by weight |
|---|---|
| Natural rubber | 100 |
| Curing agent equivalent to sulfur at | 1 to 5 |
| Accelerator | 1.0 to 1.6 |
| Accelerator activator | 2.5 to 8.0 | said rubber composition being essentially free of rubber-insoluble particulate matter and said rubber composition being characterized by exhibiting a stress loss of no more than about 25% when subjected to 10° C. decrements every 20 minutes from 70° C. to −20° C. while said composition is maintained at a constant strain of 175% elongation.

7. A spring comprising a plurality of coaxial tubes adapted for relative axial movement and a vulcanized rubber composition sandwiched between and secured to said tubes in a manner to provide yieldable resistance to said axial movement, said rubber composition being prior to vulcanization substantially as follows:

| | Parts by weight |
|---|---|
| Natural rubber | 100 |
| Curing agent equivalent to sulfur at | 1 to 5 |
| Accelerator | 1.0 to 1.6 |
| Accelerator activator | 2.5 to 8.0 | said rubber composition being essentially free of rubber-insoluble particulate matter and said rubber composition being characterized by exhibiting a stress loss of no more than about 25% when subjected to 10° C. decrements every 20 minutes from 70° C. to −20° C. while said composition is maintained at a constant strain of 175% elongation.

References Cited in the file of this patent

UNITED STATES PATENTS

| Number | Name | Date |
|---|---|---|
| 2,019,052 | Lord | Oct. 29, 1935 |
| 2,226,406 | Krotz | Dec. 24, 1940 |
| 2,231,769 | Merrill | Feb. 11, 1941 |
| 2,286,563 | Mussey | June 16, 1942 |

FOREIGN PATENTS

| Number | Country | Date |
|---|---|---|
| 47,160 | France | Nov. 7, 1936 |
| 744,402 | France | Jan. 21, 1933 |